United States Patent [19]

Sadakata et al.

[11] Patent Number: 5,338,064
[45] Date of Patent: Aug. 16, 1994

[54] TILTING TYPE STEERING APPARATUS

[75] Inventors: Kiyoshi Sadakata, Gunma; Katsumi Saito, Maebashi, both of Japan

[73] Assignee: NSK Ltd., Tokyo, Japan

[21] Appl. No.: 154,539

[22] Filed: Nov. 19, 1993

[30] Foreign Application Priority Data

Nov. 25, 1992 [JP] Japan ................. 4-086581[U]
Feb. 19, 1993 [JP] Japan ................. 5-011001[U]

[51] Int. Cl.$^5$ ............................................. B62D 1/18
[52] U.S. Cl. ................................... 280/775; 74/493
[58] Field of Search ....................... 280/775; 74/493

[56] References Cited

U.S. PATENT DOCUMENTS

| | | | |
|---|---|---|---|
| 4,541,298 | 9/1985 | Strutt | 74/493 |
| 4,732,050 | 3/1988 | Vollmer | 74/493 |
| 5,117,707 | 6/1992 | Kinoshita et al. | 74/493 |

FOREIGN PATENT DOCUMENTS

| | | |
|---|---|---|
| 59-43163 | 12/1984 | Japan . |
| 62-18121 | 5/1987 | Japan . |
| 63-32963 | 3/1988 | Japan . |
| 4-35259 | 8/1992 | Japan . |

Primary Examiner—Kenneth R. Rice
Attorney, Agent, or Firm—Shapiro and Shapiro

[57] ABSTRACT

In order to prevent a noise from being generated by the contact of a fixed meshing gear and an elevation meshing gear when a level of a steering wheel is adjusted, a fixed gear is fixed to an outer surface of a vertical plate of the fixed bracket, a lock plate is held by a hold member provided at a base of a leaf spring, and the engagement of the meshing gears is disengaged by a leg provided in the leaf spring. An inner surface of the vertical plate is always elastically urged toward the outer surface of the elevation bracket.

4 Claims, 8 Drawing Sheets

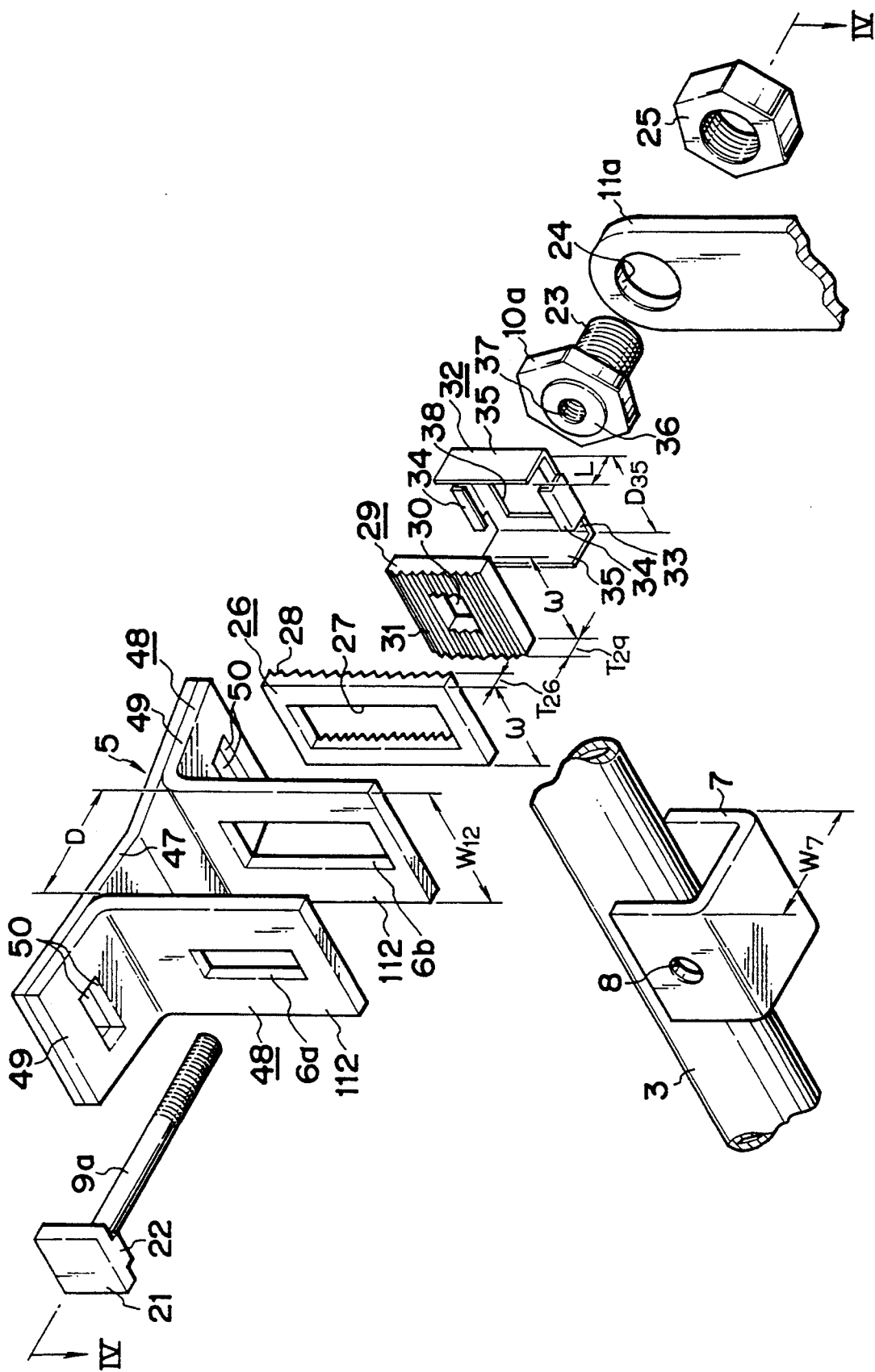

TILTING TYPE STEERING APPARATUS

BACKGROUND OF THE INVENTION

1. Field of the Invention

The present invention relates to a tilting type steering apparatus for enabling adjustment of a level of a steering wheel which steers a car.

2. Related Background Art

A level adjusting apparatus for a steering wheel called a tilting type steering apparatus to permit to change a level of a steering wheel depending on a physical feature of a driver or an attitude of the driver has been known by Japanese Utility Model Publication No. 62-18121.

The tilting type steering apparatus may be constructed as shown in FIG. 6. A steering shaft 2 which is rotated by manipulating a steering wheel 1 fixed at a top (rear) end extends through a steering column 3, which is pivotally supported around a horizontal shaft 4 to a car body at a bottom (front) end thereof and vertically movably supported to the car body at a top end thereof.

An arcuate slot 6 centered at the horizontal shaft 4 vertically extends in a fixed bracket 5 which is fixed to the car body below a dash board. An elevation bracket 7 (see FIGS. 7 to 9 to be explained later) made of a metal plate having a sufficient rigidity which is bent is fixed by welding to the top of the steering column 3 at a portion facing the fixed bracket 5.

A tilt bolt extends through holes 8 (see FIGS. 7 to 9) formed in the elevation bracket 7 and the slot 6. A width d of a head 21 (see FIGS. 7 to 9) of the tilt bolt 9 is selected to be sufficiently larger than a width $W_6$ of the slot 6 ($d > W_6$) so that the head 21 does not pass through the slot 6. The head 21 is engaged in a manner to permit only elevational movement but prevent the rotation of the slot 6. The binding and the release of a tilt nut 10 (FIGS. 7 to 9) meshed with a male screw at an end of the tilt bolt 9 are carried out by manipulating a tilt lever 11.

In order to adjust the level of the steering wheel 1, the tilt bolt 9 is moved along the slot 9 of the fixed bracket 5 while the tilt nut 10 is loosened, and the tilt nut 10 meshed with the tilt 9 is bound by the tilt lever 11.

For example, when the tilt nut 10 is bound while the tilt bolt 9 is moved to the top end of the slot 9, the steering wheel 1 is in a position shown by a solid line in FIG. 6, and when the tilt nut 10 is bound while the tilt bolt 9 is moved to the bottom end of the slot 6, the steering wheel 1 is at a descended position as shown by a chain line in FIG. 6.

In order to prevent inadvertent movement of the level of the steering wheel 1 after the adjustment of the level of the steering wheel 1, Japanese Utility Model Publication No. 59-43163 discloses a structure as shown in FIGS. 7 and 8. A fixed gear 13 is screwed to an outer surface of one of a pair of vertical plates 12 which form a fixed bracket 5.

A lock plate 14 is provided between the fixed gear 13 and the tilt nut 10 meshed with the end of the tilt bolt 9. An elevation corrugated plate 17 and a fixed corrugated plate 16 of a wash board shape, which mesh with each other, are formed on an inner surface of the lock plate 14 and an outer surface of the fixed gear 13. The lock plate 14 is resiliently urged to the fixed gear 13 by a compression spring 15 provided between the tilt nut 10 and the lock plate 14.

When the tilt nut 10 is moved leftward in FIG. 8 to fix the steering wheel 1 after the adjustment of the level thereof, the lock plate 14 is inhibited to move rightward in FIG. 8. As a result, the lock plate 14 is inhibited from the elevation while the fixed corrugated plate 16 and the elevation corrugated plate 17 are meshed with each other. Accordingly, the tilt bolt 9 which extends through the lock plate 14 is inhibited from the elevation so that the inadvertent change of the level of the steering wheel is prevented.

On the other hand, Japanese Laid-Open Utility Model Application No. 63-32963 discloses a structure as shown in FIG. 9. A lock member 18 is provided between a tilt nut 10 and a fixed bracket 5, and an elevation corrugated plate 17 formed on the lock member 18 is engageable with a fixed corrugated plate 16 formed on an outer surface of a fixed bracket. Projections 19 are formed at top and bottom ends of the inner surface of the lock member 18 so that the rotation of the lock member 18 is prevented by the engagement of the projections 19 with the slot 6. A compression spring 20 is provided between an outer surface of an elevation bracket 7 and the lock member 18 to apply a biasing force to the lock member 18 for releasing the meshing of the fixed corrugated plate 16 and the elevation corrugated plate 17.

When the tilt nut 10 is moved rightward in FIG. 9 to fix it after the adjustment of the level of the steering wheel, the lock member 18 is inhibited from the leftward displacement. As a result, the lock member 18 is prevented from the elevation while the fixed corrugated plate 16 and the elevation corrugated plate 17 are meshed with each other. Accordingly, the tilt bolt 9 which extends through the lock member 18 is inhibited from the elevation so that the inadvertent change of the level of the steering wheel is prevented.

In the structure shown in FIGS. 7 and 8 of the prior art structures described above, the lock plate 14 is kept resiliently urged to the fixed gear 13 by the resilient force of the compression spring 15. As a result, when the lock plate 14 is elevated to adjust the level of the steering wheel, the elevation corrugated plate 17 rides over the fixed corrugated plate 16 so that a person (driver) who manipulates the tilting steering apparatus feels uncomfortable feeling.

On the other hand, in the structure shown in FIG. 9, when the tilt nut 10 is loosened, the lock member 18 is urged leftward by the spring force of the compression spring 20 so that the elevation corrugated plate 17 formed on the lock member 18 and the fixed corrugated plate 16 formed on the outer surface of the fixed bracket 5 tend to be disengaged. Thus, noise will not be generated when the level of the steering wheel is adjusted so long as the dimensional accuracy of the components is assured.

In actual, however, it is difficult to secure the dimensional accuracy of the components in view of the cost, and when the level of the steering wheel is adjusted while the tilt nut 10 is loosened, noise may be generated from the meshing area of the corrugated plates 16 and 17 if a retract amount of the elevation corrugated plate is short.

In the prior art tilting steering column apparatus, the pair of vertical plates 12 which form the fixed bracket 5 are parallel to each other. In order to permit smooth elevation of the elevation bracket 7 within the vertical plates 12 when the level of the steering wheel is adjusted, a spacing D between the inner surfaces of the vertical plates 12 is selected to be sufficiently larger than a width $W_7$ of the elevation bracket 7 ($D > W_7$) as exaggeratedly shown in FIG. 10.

When the tilt nut 10 is bound to fix the level of the steering wheel, the spacing D is reduced because of the elastic deformation of the vertical plates 12 so that the inner surfaces of the vertical plates 12 and the outer surfaces of the elevation bracket 7 come closer to each other. On the other hand, when the tilt nut 10 is loosened to adjsut the level of the steering wheel, a distance L between the tilt nut 10 and a head 21 of the tilt bolt 9 is expanded and the vertical plates 12 are elastically deformed so that the inner surfaces of the vertical plates 12 and the outer surfaces of the elevation brackets 7 are moved apart from each other and a clearance 42 is formed between the inner surface of the vertical plate 12 facing the tilt nut 10 and the outer surface of the elevation bracket 7 as exaggeratedly shown in FIG. 10.

On the other hand, when the meshing of the fixed corrugated plate 16 and the elevation corrugated plate 17 are to be completely disengaged, it is necessary to form a clearance 43 between the corrugated plates 16 and 17 as exaggeratedly shown in FIG. 10. No problem will arise if the clearance 43 is formed between the fixed and elevation corrugated plates 16 and 17 when the tilt nut 10 is loosened, but in actual, a clearance 42 is first formed between the inner surface of the vertical plate 12 and the outer surface of the elevation bracket 7 and then the clearance 43 is formed. This is due to the fact that the elasticity of the vertical plates 12 is larger than that of the compression spring 20.

The above problem may be avoided if the elasticity of the vertical plates 12 is smaller than that of the compression spring 20 but a sufficiently large elasticity is required for the vertical plates 12. In addition, the increase of the elasticity of the compression spring 20 leads to the increase of the manipulation force of the tilt nut 10. Accordingly, it is difficult to make the elasticity of the vertical plates 12 smaller than the elasticity of the compression spring 20.

Further, when a stroke of the distance L between the tilt nut 10 and the head 21 of the tilt bolt 9 due to the manipulation of the tilt nut 10 is increased, the manipulation for adjusting the level of the steering wheel is rendered troublesome and it is difficult to adopt it.

On the other hand, in the structure shown in FIG. 9, when the tilt nut 10 is in the loose position, the meshing of the corrugated plates 16 and 17 is disengaged by the spring force of the compression spring 20. Accordingly, noise is not generated when the level of the steering wheel is adjsuted but it is hard to mesh the corrugated plates 16 and 17 with each other when the tilt nut is bound to fix the level of the steering wheel.

Namely, in the structure shown in FIG. 9, when the tilt nut 10 is bound while the peaks of the corrugated plates 16 and 17 face each other, the lock member 18 is urged to the outer surface of the fixed bracket 15 while the peaks abut against each other. When a vertical force is applied to the steering wheel under this condition, the level of the steering wheel will easily be changed.

Particularly in the structure shown in FIG. 9, the projections 19 formed on the lock member 18 are engaged with the slot 6 of the fixed bracket 5 in order to prevent the rotation of the lock member 18 but a certain clearance must exist at the engagement in order to permit the smooth elevation of the lock member 18. Because of this clearance, it is unavoidable that the lock member 18 is rotationally displaced even if it is small. When the lock member 18 is displaced, the apex of the fixed corrugated plate 16 and the apex of the elevation corrugated plate 17 are in a twisted positional relation so that the apexes of the corrugated plates 16 and 17 may easily abut against each other.

In the structure shown in FIGS. 7 and 8 as well as the structure shown in FIG. 9, since the coiled compression springs 15 and 20 are used to press the lock plate 15 or the lock member 18, the axial dimension (lateral direction in FIGS. 7 and 8) of the tilt bolt 9 increases.

SUMMARY OF THE INVENTION

It is an object of the present invention to provide a tilting steering apparatus which positively meshes a fixed corrugated plate and an elevation corrugated plate with each other when the level of the steering wheel is to be fixed while preventing the generation of noise by the corrugated plates at the engagement by completely disengaging the meshing of the corrugated plates when the level of the steering wheel is adjusted.

The tilting steering column apparatus of the present invention comprises: a steering column through which a steering shaft for fixing a steering wheel at a rear end thereof is rotatably inserted; a horizontal shaft for pivotally supporting a front end of said steering column; an elevation bracket fixed to a mid-portion of said steering column; a hole formed in said elevation bracket; a fixed bracket fixed to a car body to sandwich said elevation bracket by a pair of plates; a vertically extending slot formed at a position in a portion of each of said plates which aligns to said hole; a rod member having a large diameter portion incapable of passing through said slot at a base end thereof and extending through said slot and said hole; a pressing member having a shape incapable of passing through said slot and axially displaceably engaged with a portion projecting from an outer surface of said plate at an end of said rod member; a manipulation member for axially displacing said pressing member relative to said rod member; a fixed gear fixed to that portion on an outer surface of one of said plates having the outer surface thereof faced to said pressing plate which surrounds said slot; a fixed meshing gear having repeating vertical projections formed on an outer surface of said fixed gear; a lock member having an elevation meshing gear for meshing with said fixed gear on an inner surface thereof and a hole at a center thereof through which said rod member extends and held between said pressing member and said fixed gear; and a spring arranged in contact to said lock member and having an elasticity in a direction to separate an inner surface of said lock member from an outer surface of said fixed gear.

In the tilting steering apparatus of the present invention, upper ends of said pair of plates are fixed ends fixed to the car body and lower ends thereof are free ends, a spacing between said free ends when said fixed bracket is fixed to the car body is smaller than a spacing between said fixed ends, and a spacing between the inner surfaces of said pair of plates in the free state is slightly smaller than a width of said elevation bracket.

As described above, in order to make the spacing between the free ends narrower than the spacing between the fixed ends, an angle made by mount plates 45 forming a pair of elements 44 and downward plates 112 may be rendered to an obtuse angle as shown in FIG. 1A and the mount plates 45 for the elements 44 may be attached to a flat mount plane 46 to form a fixed bracket 5 as shown in FIG. 1B, or an angle made by the mount plates 45 forming the pair of elements 44 and the downward plates 112 may be made to a right angle as shown in FIG. 2A and the mount plates 45 for the elements 44 may be attached to a mount plate 46a having a center recess to form a fixed bracket 5 as shown in FIG. 2B. Further, while not shown, the opposite ends of the mount plate may be bent downward to make a downwardly opening U-shaped mount to form a pair of right and left vertical plates bent at an obtuse angle to the mount plate.

In any case, the downward plates 112 are inclined to a vertical plane by an angle $\theta$ in a free state (the elevation bracket is not inserted between the downward plates 112) after the fixed bracket 5 has been attached to the mount planes 46 and 46a of the car body. The angle of inclination $\theta$ is determined by a design consideration and an angle of approximately 2 degrees may be sufficient when both of the pair of downward plates 112 are inclined. When only one of the downward plates 112 is inclined, the angle may be approximately 4 degrees.

In the tilting steering apparatus of the present invention, the operation when the level of the steering wheel is adjusted in accordance with the physical feature of the driver is the same as that in the prior art tilting steering apparatus described above.

In the tilting steering apparatus of the present invention, the inner surfaces of the pair of vertical plates forming the fixed bracket are always elastically urged to the outer surface of the elevation bracket. As a result, when the force which presses the lock member to the fixed gear by the pressing member is released to adjust the level of the steering wheel, most of the displacement of the pressing member by the manipulation member are used to displace the lock member in order to disengage the meshing of the fixed corrugated plate and the elevation corrugated plate.

Accordingly, the generation of noise during the adjustment of the level of the steering wheel is prevented by disengaging the meshing of the corrugated plates without unduly increasing the amount of manipulation of the manipulation member.

The tilting steering apparatus of the present invention comprises a steering column through which a steering shaft for fixing a steering wheel at a rear end thereof is rotatably inserted; a horizontal shaft for pivotally supporting a front end of said steering column; an elevation bracket fixed to a mid-portion of said steering column; a hole formed in said elevation bracket; a fixed bracket fixed to a car body to sandwich said elevation bracket at right and left ends by a pair of vertical plates; a vertically extending slot formed at a position in a portion of each of said vertical plates which aligns to said hole, a rod member having a large diameter portion incapable of passing through said slot at a base end thereof and extending through said slot and said hole; a pressing member having a shape incapable of passing through said slot and axially displaceably engaged with a portion projecting from an outer surface of said plate at an end of said rod member; a manipulation member for axially displacing said pressing member relative to said rod member; a fixed gear fixed to a portion on an outer surface of at least one of said vertical plates which surrounds said slot; a fixed meshing gear having repeating vertical projections formed on an outer surface of said fixed gear; a lock member having an elevation meshing gear for meshing with said fixed gear on an inner surface thereof and a hole thereof through which said rod member extends and held between said pressing member and said fixed gear; a leaf spring arranged in association with said lock member and said fixed bracket and having an elasticity in a direction to separate an inner surface of said lock member from an outer surface of said fixed gear; and a displacement prevention member for preventing the rotational displacement of said lock plate around said rod member relative to said leaf spring.

The leaf spring includes a base having abutting against an outer surface of said lock plate and having a hole formed at a center thereof for permitting the insertion of said rod member therethrough, a pair of hold members arranged at the opposite ends of said base to hold said lock plate relative to said base, and a pair of parallel leg members bent from the front and rear ends of said base and having leading ends thereof abutted against the portions projecting from the front and rear ends of said fixed gear on the outer surfaces of said vertical plates and having leading end side surfaces thereof abutted against the front and rear ends of said fixed gear. The length of said leg members being designed to allow complete disengagement of said fixed meshing gear and the elevation meshing gear in a free state of said leaf spring.

In the tilting steering apparatus of the present invention thus constructed, the operation when the level of the steering wheel is adjusted in accordance with the physical feature of the driver is the same as that in the prior art tilting steering apparatus described above.

Particularly in the tilting steering apparatus of the present invention, when the level of the steering wheel is to be adjusted, the meshing of the fixed corrugated plate and the elevation meshing gear is completely disengaged by a spring force of a leaf spring so that the generation of noise by the corrugated plates when the lock plate is elevated is prevented.

In addition, the rotational displacement of the base of the leaf spring relative to the fixed gear is prevented by the engagement of the front and rear ends of the fixed gear and the leg. Further, the rotational displacement of the lock plate relative to the base is prevented by a displacement block member. As a result, the lock plate does not male the rotational displacement relative to the fixed gear.

Accordingly, the apexes of the fixed meshing gear and the apexes of the elevation corrugated plate are not in the twisted positional relation and the apexes of the corrugated plates hardly abut against each other. As a result, the corrugated plates are easily meshed when the level of the steering wheel is to be adjusted.

BRIEF DESCRIPTION OF THE DRAWINGS

FIG. 3 shows a developed perspective view of a first embodiment of the present invention.

DETAILED DESCRIPTION OF THE PREFERRED EMBODIMENTS

Figure 4:
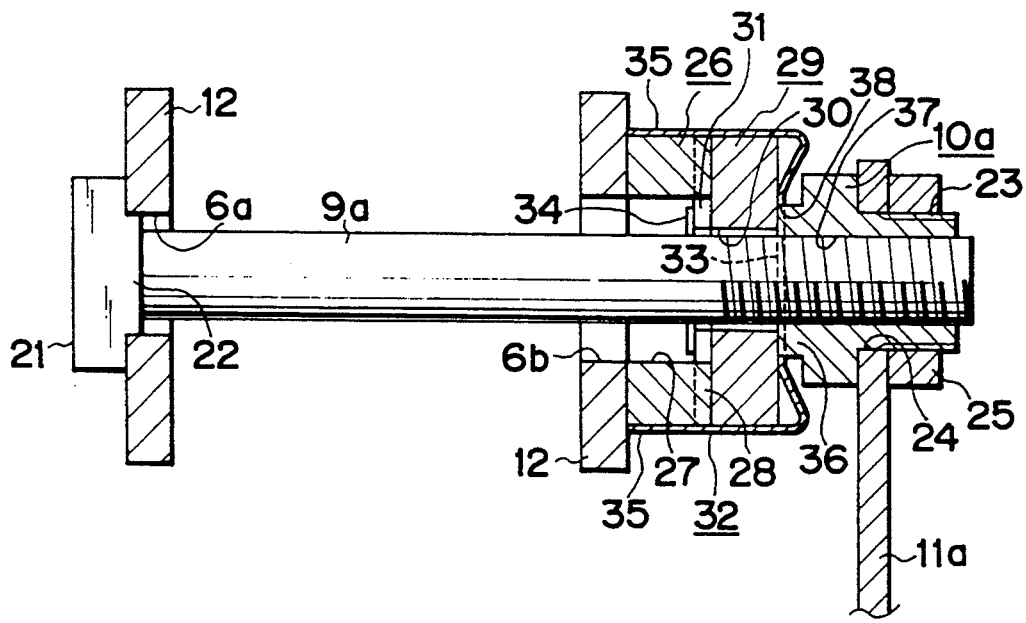
FIG. 4 shows a IV—IV sectional view of FIG. 3 in an assembled position.

FIGS. 3 and 4 show a first embodiment of the present invention. In the tilting type steering apparatus of the present invention, a steering shaft 2 which is rotated by manipulating a steering wheel 1 fixed to a top end is inserted through a steering column 3 and a lower end of the steering column 3 is pivotally supported to a car body around a horizontal shaft 4 and an upper end is vertically movably supported to the car body, as they are in FIG. 6.

As shown in FIGS. 3 and 4, a fixed bracket 5 fixed to the car body comprises a mount plate 47 and a pair of support plates 48 which are fixed by the welding to the opposite ends of a lower surface of the mount plate 47. The mount plate made of a metal plate having an elasticity and a sufficient rigidity is bent at a center thereof to be convex at a center of the lower surface to assume a substantially V shape as a whole. Each of the support plates 48 which are also made of a metal plate having an elasticity and sufficient rigidity and bent at an obtuse angle which is approximately 2 degrees smaller than a right angle has a coupling plate 49 attached to the lower surface of the mount plate 47 and a downward plate 12.

Holes 50 to which bolts (not shown) are to be inserted to support the fixed bracket 5 to the car body are formed at the opposite ends of the mount plates 47 and the coupling plates 49 which are coupled in overlap. Vertically extending slots 6a and 6b are formed in the downward plates 112. In the illustrated embodiment, the width of one slot 6a (left in FIG. 3) is narrow and the width of the other slot 6a (right in FIG. 3) is wide.

Figure 1A:
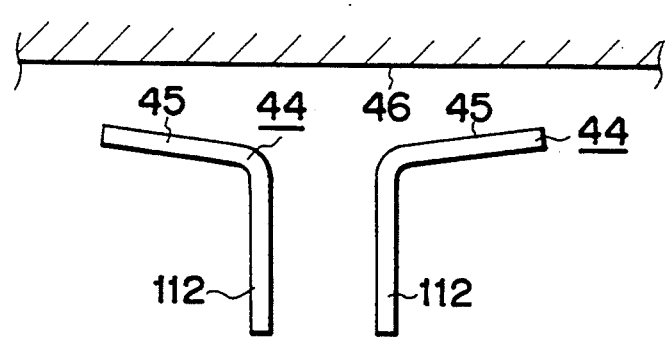
FIGS. 1A and 1B show front views of a first example of a fixed bracket used in the present invention, before and after fixing to a car body.
Figure 1B:
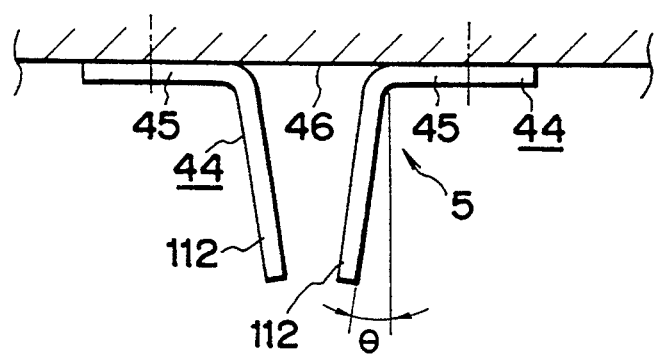
Figure 2A:
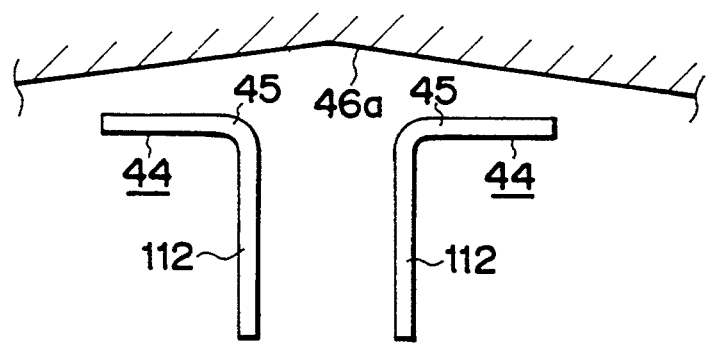
FIGS. 2A and 2B show front views of a second example of the fixed bracket used in the present invention, before and after fixing the car body.
Figure 2B:
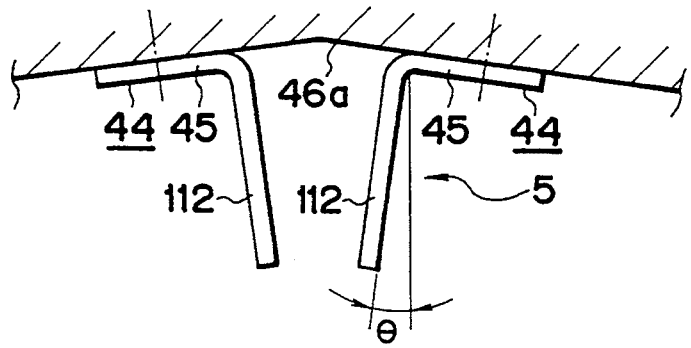

The fixed bracket 5 thus constructed is supported and fixed to a flat mount plate 46 (see FIG. 1B) provided in the car body by binding a bolt which is inserted to the holes 50 from the bottom thereof. In the fixed position, the mount plate 47 and the coupling plate 49 corresponding to the mount plates 45 are flat to cope with the mount plate 46. Accordingly, the spacing between the inner surfaces of the pair of downward plates 112 is narrower as it goes downward. The dimensions and the bending angle are selected such that the spacing D between the inner surfaces at the vertically middle point of the pair of downward plates 112 is slightly smaller than a width $W_7$ of an elevation bracket 7 to be described later ($D < W_7$) in a free state.

The elevation bracket 7 made of a bent metal plate having a sufficient rigidity is fixed by welding to a bottom surface at a top of the steering column 3 which faces the fixed bracket 5. When the tilting steering column apparatus is assembled, the elevation bracket 7 is inserted between the downward plates 112 while the spacing between the inner surface of the pair of downward plates 112 is resiliently spread. Accordingly, in the assembled position of the tilting steering column apparatus, the inner surfaces of the downward plates 112 and the outer surface of the elevation bracket 7 are always kept elastically abutted.

A hole 8 to which a tilt bolt 9a which is a rod member is to be inserted is formed in the elevation bracket 7. A head 21 having a large diameter which cannot pass through the slot 6a is formed at a base end of the tilt bolt 9a. A projection 22 which engages with the slot 6a is formed vertically on the inner surface of the head 21 to prevent the rotation of the tilt bolt 9a.

A tilt nut 10a which is a pressing member is meshed with the tilt bolt 9a at an end thereof which extrudes from the outer wall of the downward plate 112 when the tilt bolt 9a extends through the slots 6a and 6b and the hole 8. The tilt nut 10a is displaceable along the axis of the tilt bolt 9a (lateral in FIG. 4) by manipulating a tilt lever 11a which is a manipulation member. A projection 36 is formed on the inner surface (left end surface in FIG. 4) of the tilt nut 10a. A threaded hole 37 formed at a center of the tilt nut 10a and to which the tilt bolt 9a is meshed opens at the center of the projection 36.

A nut 25 is meshed with an end of a male screw 23 formed in an outer half (right half in FIGS. 3 and 4) of the tilt nut 10a while the male screw 23 is inserted in to a circular hole 24 formed at the base end of the tilt 11a, and the nut 25 is bound to fix the base end of the tilt lever 11a to the tilt nut 10a. Accordingly, by manipulating the tilt lever 11a, the tilt nut 10a is axially displaced along the tilt bolt 9a and the distance between the tilt nut 10a and the head 21 is changed.

A fixed gear (corrugated plate) 26 is fixed by welding or bolting to the outer surface (right surface in FIG. 4) of one of the pair of downward plates 112 which form the fixed brackets 5. The fixed gear 26 is rectangular as a whole and a slot 27 of substantially same shape and size as those of the slot 6b of the downward plate 112 is formed at a center thereof.

A width w of the fixed gear 26 is smaller than a width $W_{12}$ of the downward plate 112 ($W_{12} > w$) so that when the fixed gear 26 is fixed to the outer surface of the downward plate 112 while the slot 27 and the slot 6b are aligned, the front and rear ends of the outer surface of the downward plate 112 are exposed in front of and behind the fixed gear 26. A fixed corrugate plate 28 having repeated wave-shaped projections along the vertical direction is formed on the outer surface (right surface in FIG. 4) of the fixed gear 26 at a position facing the slots 6b and 27. In the illustrated embodiment, the fixed corrugated plate 28 is shaped to ratchet teeth to provide a large resistive force to the downward displacement of a lock plate 29 to be described later.

The lock plate 29 which is a lock member is provided on the outer surface of the fixed gear 26. The lock plate 29 has the same width as that of the fixed gear 26 and a hole 30 through which the tilt bolt 9a extends is formed at a center thereof. An elevation corrugated plate 31 which meshes with the fixed corrugated plate 28 is formed on the inner surface (left surface in FIG. 4) of the lock plate 29.

A leaf spring 32 is provided in association with the lock plate 29 and the fixed bracket 5 to impart a spring force to the lock plate 29 to move it away from the outer surface of the fixed bracket 5. The leaf spring 32 which is made of a plate material having a sufficient rigidity such as a stainless steel spring material has a base 33, a pair of upper and lower holding members 34 and a pair of front and rear leg members 35.

A hole 38 into which a projection 36 formed at the inner end of the tilt nut 10a is inserted is formed at a center of the base 33, and the base 33 is made square. The holding members 34 are formed at the upper and lower ends of the base 33 and bent at a right angle toward the downward plate 112 of the fixed bracket 5. The holding plates 34 have L-shaped sections and they hold the upper and lower ends of the lock plate 29 to hold it without play relative to the base 33.

The pair of leg members 35 are bent at a right angle from the front and rear ends of the base 33 toward the downward plate 112. The spacing $D_{35}$ between the pair of leg members 35 is substantially equal to the width w of the fixed gear 26 and the lock plate 29 ($D_{35} \simeq w$). Accordingly, when the leaf spring 32 and the lock plate 29 are coupled by the hold members 34 and the elevation meshing gear 31 and the fixed meshing gear 28 of the fixed gear 26 are arranged close to each other or abutted against each other, the end of the inner plane of each of the leg members 35 abuts against the front and rear ends of the fixed gear 26 and the mid-point of the inner plane abuts against the front and rear ends of the lock plate 29.

Accordingly, the rotational displacement of the leaf spring 32 around the tilt bolt 9a relative to the fixed gear 26 is prevented by the abutment of the ends of the inner planes of the leg members 35 and the front and rear ends of the fixed gear 26, and the rotational displacement of the lock plate 29 around the tilt bolt 9a relative to the leaf spring 32 is prevented by the abutment of the mid-points of the inner planes of the leg members 35 and the front and rear ends of the lock plate 29. As a result, the rotational displacement of the lock plate 29 around the tilt bolt 9a relative to the fixed gear 26 is prevented.

The ends of the pair of front and rear leg members 35 are abutted against the projections from the front and rear ends of the fixed gear 26 on the outer surface of the vertical plate 12. The length L of the leg members 35 is larger than the sum of the thickness $T_{26}$ of the fixed gear 26 and the thickness $T_{29}$ of the lock plate 29 ($L > T_{26} + T_{29}$). Accordingly, the meshing of the fixed meshing gear 28 and the elevation meshing gear 31 is completely disengaged.

In the tilting type steering apparatus of the present invention, when the level of the steering wheel is to be adjusted in accordance with the physical feature of the driver, the tilt level 11a is manipulated as it is in the prior art tilting type steering apparatus to loosen the tilt nut 10a and the tilt nut 10a is moved rightward in FIG. 4.

When the force pressing the lock plate 29 by the projection 36 of the tilt nut 10a is released as the tilt nut 10a is moved, the lock plate 29 is displaced rightward in FIG. 4 by the spring force of the leaf spring 32. The spring force of the leaf spring 32 is not so large but the inner surfaces of the downward plates 112 and the outer surface of the elevation bracket 7 always abut against each other and no gap is formed between the surfaces by the release of the pressing force and the displacement of the leaf spring 32 is totally utilized to displace the elevation meshing gear 31 rightward in FIG. 4.

As a result, the engagement of the fixed meshing gear 28 on the outer surface of the fixed gear 26 and the elevation meshing gear 31 on the inner surface of the lock plate 29 is disengaged so that the lock plate 29 and the tilt bolt 9a fitted to the hole 30 at the center of the lock plate 29 are free to be vertically moved.

Then, the level of the steering wheel 1 (see FIG. 6) is adjusted while the tilt bolt 9a is moved along the slots 6a and 6b formed in the downward plates 112 of the fixed bracket 5 and the tilt nut 10a meshed with the tilt bolt 9a is moved to the left by the tilt lever 11a to elastically deform the leaf spring 32 and the lock plate 29 is urged to the fixed gear 26 by the projection 36 of the tilt nut 10a. Thus, the top of the steering column 3 is supported to the fixed bracket 5 fixed to the car body.

In the released position of the pressing force by the tilt nut 10a, the meshing of the elevation meshing gear 31 of the lock plate 29 and the fixed meshing gear 28 of the fixed gear 26 is completely disengaged. Accordingly, no noise is generated by the meshing of the gears 31 and 28 when the level of the steering wheel 1 is adjusted.

As described above, the pair of front and rear leg members 35 of the left spring 32 abut against the fixed gear 26 and the front and rear ends of the lock plate 29 so that the rotational displacement of the members 26 and 29 around the tilt bolt 9a is prevented. Accordingly, when the meshing of the meshing gears 28 and 31 are disengaged to adjust the level of the steering wheel 1, the peak of the fixed meshing gear 28 and the peak of the elevation meshing gear 31 are not brought into a twisted position. Accordingly, the peaks of the meshing gears 28 and 31 are hard to abut against each other and the meshing gears 28 and 31 are easily meshed when the level of the steering wheel 1 is not be fixed.

Figure 5:
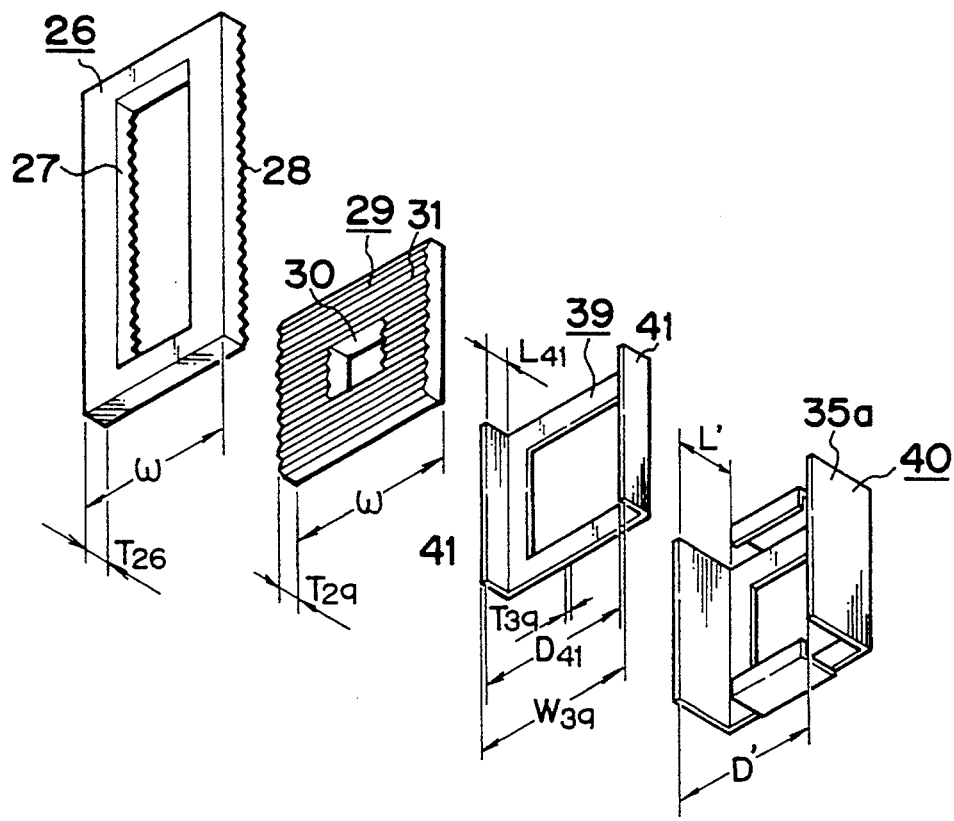
FIG. 5 shows a developed perspective view of a second embodiment of the present invention.

FIG. 5 shows a second embodiment of the present invention. In the present embodiment, a first spring 39 for preventing the rotation of the lock plate 29 relative to the fixed gear 26 and a second spring 40 for disengaging the elevation meshing gear 31 of the lock plate 29 and the fixed meshing gear 28 of the fixed gear 26 when the level of the steering wheel 1 (see FIG. 4) is to be adjusted are separately provided.

A pair of bent members 41 are formed at front and rear ends of the first spring 39 held between the second spring 40 and the lock plate 29. The length $L_{41}$ of the bent plates 41 is larger than the thickness $T_{29}$ of the lock plate 29 ($L_{41} > T_{29}$) but the ends of the bent plates 41 do not abut against the outer surface of the downward plate 112 (see FIGS. 3 and 4). The spacing $D_{41}$ between the bent plates 41 is substantially equal to the width w of the fixed gear 26 and the lock plate 29 ($D_{41} \simeq w$) Accordingly the ends of the inner surfaces of the bent plates 41 abut against the front and rear ends of the fixed gear 26 and the base of the inner surface abuts against the front and rear ends of the lock plate 29 to prevent the rotation of the lock plate 29 relative to the fixed gear 26.

On the other hand, the second spring 40 is formed into the same shape as that of the leaf spring 32 in the first embodiment. The length L' of the leg members 35a is larger than the sum of the thickness $T_{26}$ of the fixed gear 26, the thickness $T_{29}$ of the lock plate 29 and the thickness $T_{39}$ of the first spring 39 ($L' > T_{26} + T_{29} + T_{39}$). Accordingly, in the free state of the second leaf spring 40, the meshing of the fixed meshing gear 28 and the elevation meshing gear 31 is completely disengaged. The spacing D' between the leg members 35 is equal to or larger than the outer dimension $W_{39}$ of the first leaf spring ($D' \geq W_{39}$).

In the presnet embodiment, the elasticities of the first leaf spring 39 and the second leaf spring 40 may be changed as required by the respective functions. The design to assure the prevention of the rotation of the lock plate 28 is readily attained without unduly increasing the force required to manipulate the tilt lever 11a (FIGS. 3 and 4).

Figure 9:
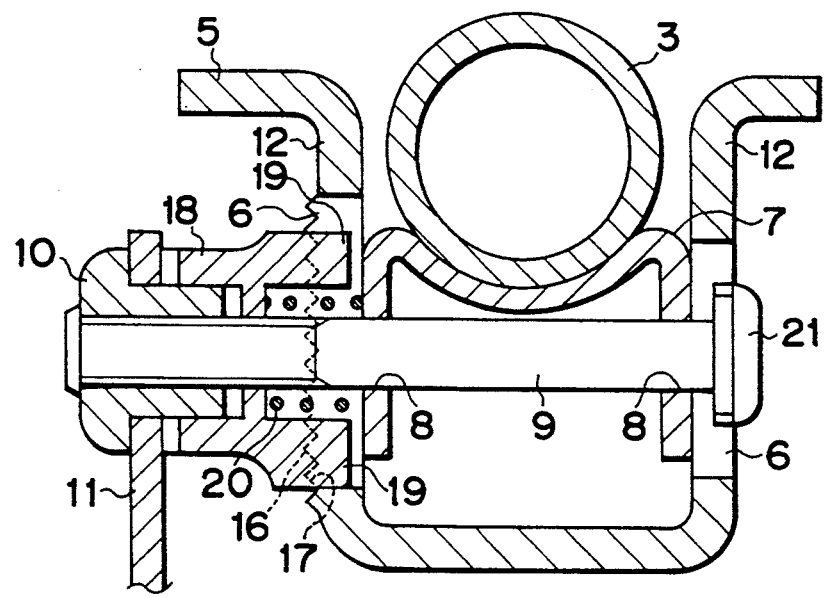
FIG. 9 shows a sectional view of a second embodiment of the prior art structure.
Figure 10:
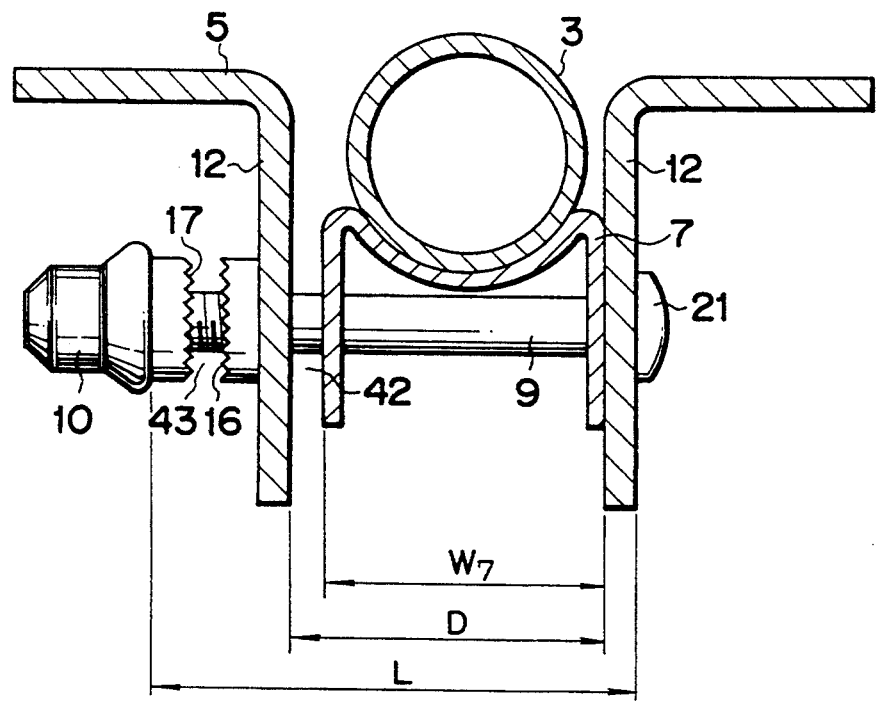
FIG. 10 shows a sectional view, in an exaggerated manner, of a clearance created when the level of a steering wheel is adjusted.

The present invention is not limited to the illustrated embodiments. For example, it may be applicable to the prior art structure shown in FIG. 9. Namely, the lower ends of the pair of vertical plates 12 shown in FIG. 9 may be free ends and the vertical plates 12 may be non-parallel in the free state and the inner surfaces of the vertical plates 12 the outer surfaces of the elevation bracket 7 may always be abutted against each other so that the meshing of the fixed meshing gear 16 and the elevation meshing gear 17 can be disengaged without increasing the amount of manipulation of the tilt lever 11.

Figure 6:
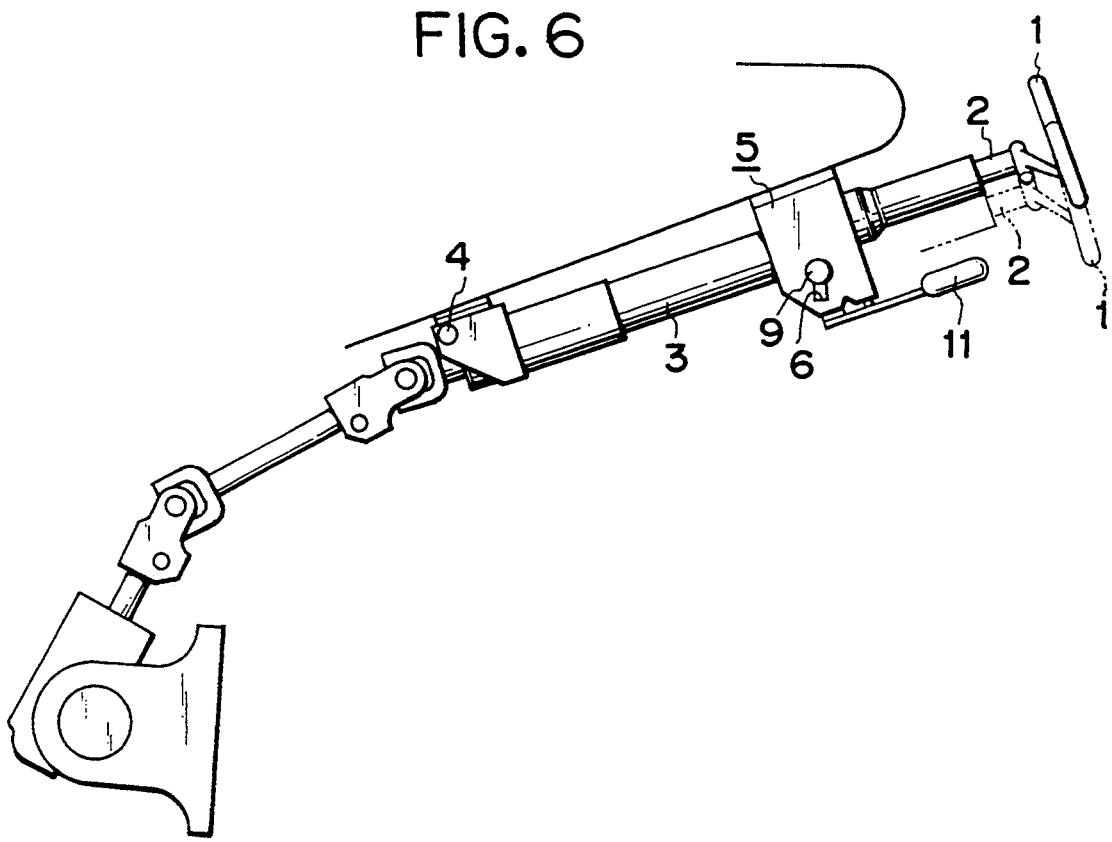
FIG. 6 shows a side view of an overall configuration of a tilting type steering apparatus of the present invention.
Figure 7:
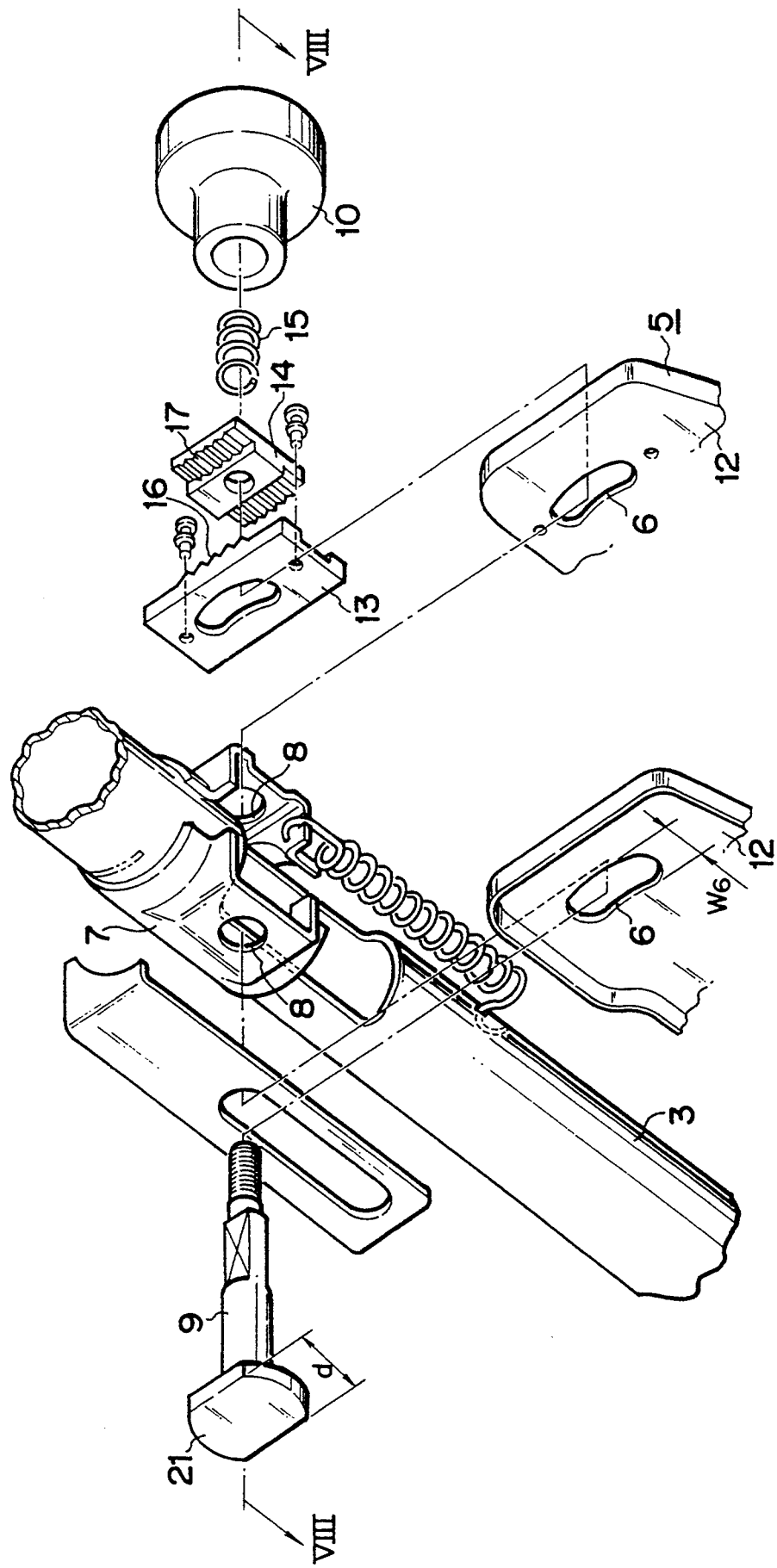
FIG. 7 shows a developed perspective view of a first example of a prior art structure.
Figure 8:
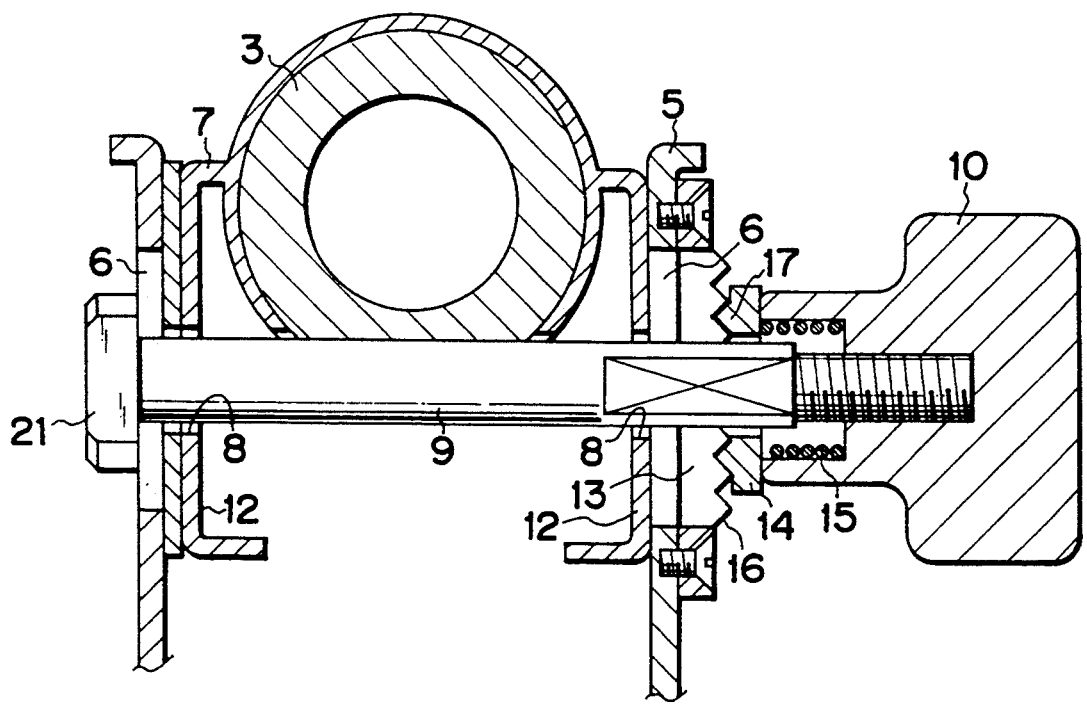
FIG. 8 shows a VII—VII sectional view of FIG. 5 in an assembled position.
Figure 11:
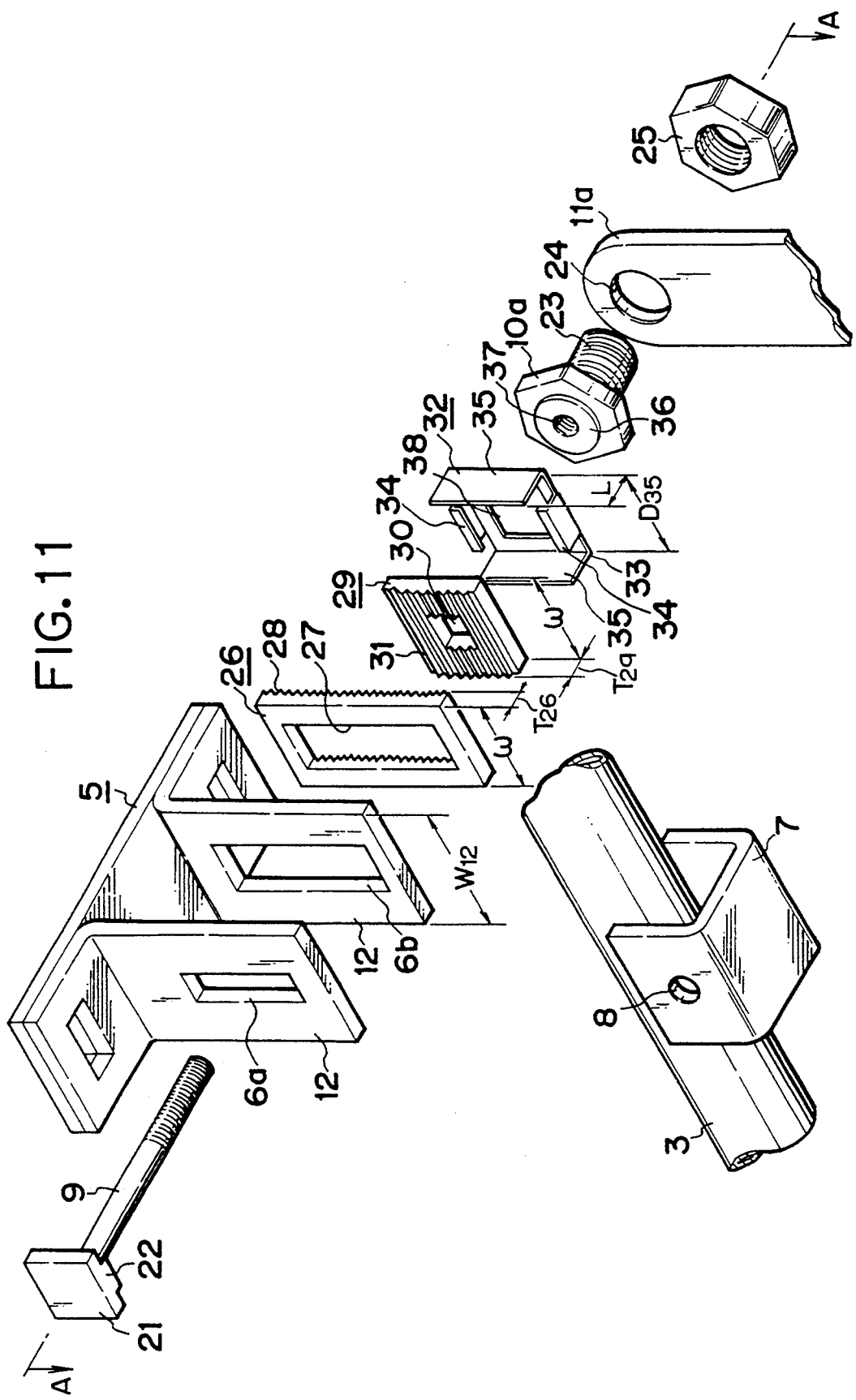
FIG. 11 shows a developed perspective view of other embodiment.

FIG. 11 shows other embodiment of the present invention. In the tilting type steering apparatus of the present embodiment, the steering shaft 2 which is rotated by the manipulation of the steering wheel 1 fixed at the top in FIG. 6 is inserted into the steering column 3 as it is in the previous embodiments, and the lower end of the steering column 3 is swingable supported to the car body around the horizontal shaft 4 and the top thereof is vertically movably supported to the car body.

The vertical adjustment portion is constructed as shown in FIGS. 11 and 4. Vertically extending slots 6a and 6b are formed in the vertical plates 12 of the fixed bracket 5 fixed to the car body. In the embodiment shown, the width of one (left in FIG. 11) slot 6a is narrow and the width of the other (right in FIG. 11) slot 6b is wide. An elevation bracket 7 constructed by bending a metal plate having a sufficient rigidity is fixed by welding a portion of the top lower surface of the steering column 3 held by the fixed bracket 5. A circular hole 8 through which the tilt bolt 9 extends is formed in the elevation bracket 7.

A head 21 having a large diameter which cannot pass through the slot 6a is formed at the base end of the tilt bolt 9a which is a rod member. A projection 22 for engaging with the slot 6a is vertically formed on the inner surface of the head 21 to prevent the rotation of the tilt bolt 9. Other elements are identical to those of the previous embodiment and the detailed description thereof is omitted.

In the embodiment of FIG. 11, the pair of leg members 12 also function as the displacement prevention members to prevent the rotation of the lock plate 29.

When the level of the steering wheel is adjusted in accordance with the physical feature of the driver by the tilting type steering wheel of the present embodiment, the tilt lever 11a is manipulated as it is in the tilting type steering apparatus of the previous embodiment so that the tilt nut 10a is loosened and the tilt nut 10a is moved rightward in FIG. 4.

When the force to press the lock plate 20 by the projection 36 of the tilt nut 10a is released as the tilt nut 10a is moved, the lock plate 29 is displaced rightward in FIG. 4 by the spring force of the leaf spring 32. As a result, the engagement of inner surface of the lock plate 29 and the elevation meshing gear 31 is disengaged and the lock plate 29 and the tilt bolt 9a inserted in the hole 30 at the center of the lock plate 29 are free to be moved vertically.

The level of the steering wheel 1 (see FIG. 6) is adjusted while the tilt bolt 10a is moved along the slots 6a and 6b formed in the vertical plates 12 of the fixed bracket 5, and the tilt nut 10a meshed with the tilt bolt 9a is moved leftward by the tilt lever 11a to elastically deform the leaf spring 32 and the lock plate 29 is pressed to the fixed gear 26 by the projection 36 of the tilt nut 10a. Accordingly, the top of the steering column 3 is supported to the fixed bracket 5 fixed to the car body while the level of the steering wheel 1 is appropriately adjusted.

In the release state of the pressing force by the tilt nut 10a, the meshing of the elevation meshing gear 31 of the lock plate 29 and the fixed meshing gear 28 of the fixed gear 26 is completely disengaged so that no noise is generated by the meshing of the meshing gears 31 and 28 when the level of the steering wheel 1 is adjusted.

As described above, the pair of front and rear leg members 35 of the leaf spring 32 abut against the fixed gear 26 and the front and rear ends of the lock plate 29 so that the rotational displacement of the members 26 and 29 around the tilt bolt 9a is prevented. Accordingly, the peak of the fixed meshing gear 28 and the peak of the elevation meshing gear 31 are not brought into a twisted position when the meshing of the meshing gears 28 and 31 is disengaged to adjust the level of the steering wheel 1. Accordingly, the peaks of the meshing gears 28 and 31 are hard to abut against each other and the meshing gears 28 and 31 are easily meshed to each other when the level of the steering wheel 1 is to be fixed.

In the tilting type steering apparatus of the present invention, noise is not generated by the manipulation and the level of the steering wheel is positively fixed and the value of the product is enhanced.

What is claimed is:

1. A tilting type steering column apparatus comprising:
    a steering column through which a steering shaft for fixing a steering wheel at a rear end thereof is rotatably inserted;
    a horizontal shaft for pivotally supporting a front end of said steering column;
    an elevation bracket fixed to a mid-portion of said steering column;
    a hole formed in said elevation bracket;
    a fixed bracket fixed to a car body to sandwich said elevation bracket by a pair of plates;
    a vertically extending slot formed at a position in a portion of each of said plates which aligns to said hole;
    a rod member having a large diameter portion incapable of passing through said slot at a base end thereof and extending through said slot and said hole;
    a pressing member having a shape incapable of passing through said slot and axially displaceably engaged with a portion projecting from an outer surface of said plate at an end of said rod member;
    a manipulation member for axially displacing said pressing member relative to said rod member;
    a fixed gear fixed to that portion on an outer surface of one of said plates having the outer surface thereof faced to said pressing plate which surrounds said slot;
    a fixed meshing gear having repeating vertical projections formed on an outer surface of said fixed gear;
    a lock member having an elevation meshing gear for meshing with said fixed gear on an inner surface thereof and a hole at a center thereof through which said rod member extends and held between said pressing member and said fixed gear; and a spring arranged in contact to said lock member and having an elasticity in a direction to separate an inner surface of said lock member from an outer surface of said fixed gear;

upper ends of said pair of plates being fixed ends fixed to the car body and lower ends thereof being free ends;

a spacing between said free ends when said fixed bracket is fixed to the car body being smaller than a spacing between said fixed ends and a spacing between the inner surfaces of said pair of plates in the free state being slightly smaller than a width of said elevation bracket.

2. A tilting steering column apparatus according to claim 1 wherein said pair of plates are bent at an obtuse angle and mount planes of said plates are flat.

3. A tilting steering column apparatus according to claim 1 wherein said pair of plates are bent at a right angle and mount planes of said plates are inclined to face each other.

4. A tilting type steering apparatus comprising:

a steering column through which a steering shaft for fixing a steering wheel at a rear end thereof is rotatably inserted;

a horizontal shaft for pivotally supporting a front end of said steering column;

an elevation bracket fixed to a mid-portion of said steering column;

a hole formed in said elevation bracket;

a fixed bracket fixed to a car body to sandwich said elevation bracket at right and left ends by a pair of vertical plates;

a vertically extending slot formed at a position in a portion of each of said vertical plates which align to said hole, a rod member having a large diameter portion incapable of passing through said slot at a base end thereof and extending through said slot and said hole;

a pressing member having a shape incapable of passing through said slot and axially displaceably engaged with a portion projecting from an outer surface of said plate at an end of said rod member;

a manipulation member for axially displacing said pressing member relative to said rod member;

a fixed gear fixed to a portion on an outer surface of at least one of said vertical plates which surrounds said slot;

a fixed meshing gear having repeating vertical projections formed on an outer surface of said fixed gear;

a lock member having an elevation meshing gear for meshing with said fixed gear on an inner surface thereof and a hole thereof through which said rod member extends and held between said pressing member and said fixed gear;

a leaf spring arranged in association with said lock member and said fixed bracket and having an elasticity in a direction to separate an inner surface of said lock member from an outer surface of said fixed gear; and a displacement prevention member for preventing the rotational displacement of said lock plate around said rod member relative to said leaf spring;

said leaf spring including a base having abutting against an outer surface of said lock plate and having a hole formed at a center thereof for permitting the insertion of said rod member therethrough, a pair of hold members arranged at the opposite ends of said base to hold said lock plate relative to said base, and a pair of parallel leg members bent from the front and rear ends of said base and having leading ends thereof abutted against the portions projecting from the front and rear ends of said fixed gear on the outer surfaces of said vertical plates and having leading end side surfaces thereof abutted against the front and rear ends of said fixed gear;

the length of said leg members being designed to allow complete disengagement of said fixed meshing gear and the elevation meshing gear in a free state of said leaf spring.

* * * * *